(12) United States Patent
Takamori et al.

(10) Patent No.: US 10,919,264 B2
(45) Date of Patent: Feb. 16, 2021

(54) ADHESIVE SHEET

(71) Applicant: Henkel AG & Co. KGaA, Duesseldorf (DE)

(72) Inventors: Ai Takamori, Osaka (JP); Kenji Matsuda, Osaka (JP); Itsuro Tomatsu, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/520,688

(22) Filed: Oct. 22, 2014

(65) Prior Publication Data

US 2015/0037596 A1 Feb. 5, 2015

Related U.S. Application Data

(63) Continuation of application No. PCT/JP2013/062803, filed on Apr. 25, 2013.

(30) Foreign Application Priority Data

Apr. 27, 2012 (JP) .................................. 2012-103435

(51) Int. Cl.
*C09J 153/00* (2006.01)
*B32B 7/12* (2006.01)
(Continued)

(52) U.S. Cl.
CPC ............ *B32B 7/12* (2013.01); *C08L 23/0884* (2013.01); *C08L 23/0892* (2013.01); *C08L 23/10* (2013.01);
(Continued)

(58) Field of Classification Search
CPC .. C08L 23/10; C08L 23/0884; C08L 23/0892; C08L 23/142; C08L 51/06;
(Continued)

(56) References Cited

U.S. PATENT DOCUMENTS 5,604,033 A 2/1997 Arthurs et al.
5,994,474 A 11/1999 Wey et al.
(Continued)

FOREIGN PATENT DOCUMENTS

CN 1841786 A 10/2006
EP 0758029 A2 2/1997
(Continued)

OTHER PUBLICATIONS

Machine translation of JP 2009-057400, retrieved Dec. 27, 2017.*
(Continued)

*Primary Examiner* — Michael B Nelson
(74) *Attorney, Agent, or Firm* — James E. Piotrowski (57) ABSTRACT

An adhesive sheet comprising a hot-melt adhesive layer. The hot-melt type adhesive layer comprises a modified polymer (A) to which a cross-linkable group is bonded and a polyolefin (B). The adhesive sheet can adhere to various adherends and the adhesive becomes less likely to squeeze out from an adherend in thermal fusion bonding and sealing of the adherend. In a laminate comprising the adhesive sheet the adhesive layer does not squeeze out from the adherend without being affected by the material of the adherend.

13 Claims, 2 Drawing Sheets

(51) Int. Cl.
| | |
|---|---|
| *C09J 151/06* | (2006.01) |
| *C09J 123/14* | (2006.01) |
| *C09J 123/08* | (2006.01) |
| *C08L 23/08* | (2006.01) |
| *C08L 51/06* | (2006.01) |
| *C08L 23/10* | (2006.01) |
| *C08L 23/14* | (2006.01) |
| *C09J 7/35* | (2018.01) |
| *C08L 93/00* | (2006.01) |
| *C09J 123/12* | (2006.01) |
| *C09J 123/20* | (2006.01) |

(52) U.S. Cl.
CPC ............ *C08L 23/142* (2013.01); *C08L 51/06* (2013.01); *C08L 93/00* (2013.01); *C09J 7/35* (2018.01); *C09J 123/08* (2013.01); *C09J 123/0815* (2013.01); *C09J 123/0892* (2013.01); *C09J 123/12* (2013.01); *C09J 123/142* (2013.01); *C09J 123/20* (2013.01); *C09J 151/06* (2013.01); *C09J 153/00* (2013.01); *C08L 2205/02* (2013.01); *C08L 2205/035* (2013.01); *C09J 2301/122* (2020.08); *C09J 2301/304* (2020.08); *C09J 2423/00* (2013.01); *C09J 2423/04* (2013.01); *C09J 2423/10* (2013.01); *C09J 2453/00* (2013.01)

(58) Field of Classification Search
CPC ................ C08L 93/00; C08L 2205/02; C08L 2205/035; C09J 123/142; C09J 123/0892; C09J 151/06; C09J 123/08; C09J 123/0815; C09J 123/12; C09J 123/20; C09J 153/00; C09J 2201/122; C09J 2201/61; C09J 2423/00; C09J 2423/04; C09J 2423/10; C09J 2453/00; C09J 7/0203; B32B 7/12
See application file for complete search history.

(56) References Cited

U.S. PATENT DOCUMENTS

| | | | |
|---|---|---|---|
| 6,218,017 B1 * | 4/2001 | Yamashita | B32B 9/00 428/424.2 |
| 7,285,334 B1 * | 10/2007 | Yamashita | H01M 2/0267 428/220 |
| 2001/0007001 A1 | 7/2001 | Rodriguez et al. | |
| 2002/0127362 A1 * | 9/2002 | Jansen | B32B 3/02 428/40.1 |
| 2003/0082445 A1 * | 5/2003 | Smith | B32B 27/08 429/176 |
| 2003/0162882 A1 | 8/2003 | Grimm et al. | |
| 2004/0029001 A1 * | 2/2004 | Yamazaki | H01M 2/021 429/176 |
| 2004/0216778 A1 | 11/2004 | Ferri et al. | |
| 2008/0302417 A1 | 12/2008 | Inoue et al. | |
| 2010/0206477 A1 | 8/2010 | Stammer et al. | |
| 2010/0216016 A1 * | 8/2010 | Seino | H01M 2/021 429/185 |
| 2011/0046290 A1 | 2/2011 | Toyoda et al. | |
| 2011/0060078 A1 * | 3/2011 | Becker et al. | 524/68 |
| 2012/0128833 A1 * | 5/2012 | Patel | C09J 123/0815 426/106 |
| 2013/0209036 A1 | 8/2013 | Morita et al. | |

FOREIGN PATENT DOCUMENTS

| | | |
|---|---|---|
| EP | 1209094 A1 | 5/2002 |
| JP | 63244552 A | 10/1988 |
| JP | 08106884 A | 4/1996 |
| JP | 2000144074 | 5/2000 |
| JP | 2007048504 A | 2/2007 |
| JP | 2009-057400 | * 12/2009 |
| JP | 201160501 | 3/2011 |
| JP | 2011052049 A | 3/2011 |
| JP | 2012103435 | 5/2012 |
| WO | 8911513 A1 | 11/1989 |

OTHER PUBLICATIONS

International Search Report issued in connection with International Patent Application No. PCT/JP2013/062803 dated Jul. 16, 2013.

* cited by examiner

ADHESIVE SHEET

TECHNICAL FIELD

The present invention relates to an adhesive sheet, and particularly to an adhesive sheet which is used for electric instruments. As used herein, "electric instrument" means an instrument which converts the other energy into electric energy (electricity), an instrument which converts electric energy into another energy, and an instrument which stores electric energy as electric energy or another energy. Specific examples of the electric instrument include: chemical batteries, such as an alkali dry battery and a lithium ion battery; and, physical batteries such as a solar battery and a capacitor.

BACKGROUND ART

Heretofore, an adhesive has been widely used as means for mutually fixing members. As an example of the adhesive, for example, a liquid adhesive, a thermosetting adhesive, a hot-melt adhesive, or a photocurable adhesive is used.

The liquid adhesive and the thermosetting adhesive are liquid or pasty, and it is necessary to adjust the coating amount of these adhesives from the viewpoint of work environment and adhesion reliability in the case of their handling.

Therefore, high technical skill and mastery are commonly required in workers. Moreover, a curing treatment thereof is absolutely required and such curing treatment often requires a long time.

The photocurable adhesive commonly requires high technical skill and mastery in workers with respect to the method of storing the photocurable adhesive and the method of handling it at the working site. Furthermore, the photocurable adhesive requires an irradiation/curing step by an ultraviolet irradiation device, and also the operation of such device requires high technical skill and mastery.

In order to solve these problems, it is known to use a hot-melt type adhesive sheet which is softened by heating and thus can be used for bonding, while it is usually in a form of a solid sheet.

A hot-melt type adhesive sheet is usually produced by processing a single hot-melt adhesive into a sheet-like shape, or supporting a hot-melt adhesive on a surface of a base material sheet made of a film material. Such a hot-melt type adhesive sheet is used in various fields of paper processing, disposable products, and building materials. It has recently been used in electric instruments which are incorporated into note-type PCs, mobile phones, and automobiles.

Patent Documents 1 to 2 disclose use of an adhesive sheet as means for improving performances of a battery.

Patent Document 1 discloses that a rubber based hot-melt adhesive, an olefin based hot-melt adhesive, and a polyester based hot-melt adhesive are used as an insulation sheet of a battery so as to prevent short circuit of the battery (see Patent Document 1, [0001], [0016]). These hot-melt adhesives are selected taking a material of an adherend into consideration since adhesion may deteriorate depending on the material of the adherend.

Patent Document 2 relates to an invention of a packing material of a lithium battery and discloses, as an adhesive resin layer composing the packing material, a layer composed of a maleic anhydride modified polypropylene resin and a maleic anhydride modified styrene based elastomer resin (see Patent Document 2, [0041]). The publication also discloses that the maleic anhydride modified polypropylene resin may be a hot-melt type adhesive (see Patent Document 2, [0025]). The packing material of the same document is a multilayer film in which a lot of layers such as an aluminum foil layer, a chemical-treated layer, and a sealant layer are formed and laminated, in addition to the adhesive resin layer, (see Patent Document 2, Claim 1, [0003]). Such a multilayer film is processed into a bag shape and used for packing of a lithium ion battery.

Figure 5:
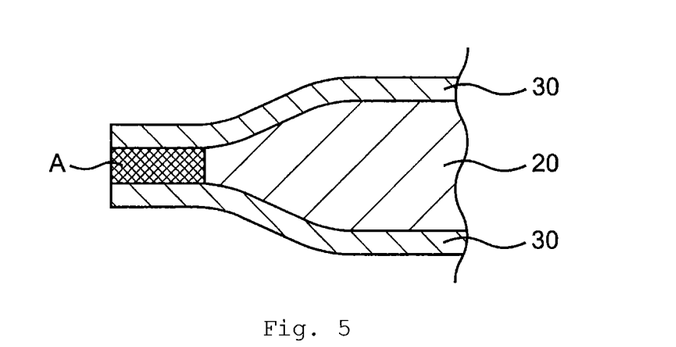
FIG. 5 is a schematic sectional view showing another embodiment of the use of an adhesive sheet.

The multilayer film packing material of a lithium ion battery contains an electrolytic solution therein, and is sealed so as not to leak the material contained therein (see Patent Document 2, [0004]). There is known means for heat-sealing the end of a packing material 30 by an adhesive sheet A as one of sealing means, as shown in FIG. 5. However, an adhesive is likely to squeeze out from the packing material by thermocompression bonding of the adhesive, and thus fail to obtain sufficient adhesion force.

Patent Document 1: JP P2000-144074 A
Patent Document 2: JP 2011-060501A

DISCLOSURE OF THE INVENTION

Problems to be Solved by the Invention

The present invention has been made so as to achieve the above object, and an object of the present invention is to provide an adhesive sheet having satisfactory adhesion to various adherends, in which an adhesive does not squeeze out from an adherend in thermocompression bonding of the adherend to the adhesive sheet. Another object of the present invention is to provide a laminate obtainable by using such adhesive sheet.

Means for Solving the Problems

The present inventors have intensively studied and found that, surprisingly, it is possible to solve the above problems when using a hot-melt type adhesive layer obtained by mixing a polymer, which is modified by giving a cross-linkable group, with a specific thermoplastic resin, and thus completing the present invention.

That is, the present invention provides, in an aspect, an adhesive sheet comprising a hot-melt type adhesive layer, wherein the hot-melt type adhesive layer comprises a modified polymer (A) to which a cross-linkable group is given, and a polyolefin (B).

The present invention provides, in an embodiment, the adhesive sheet, wherein the hot-melt type adhesive layer comprises a modified polymer (A) to which a functional group containing silicon is given.

The present invention provides, in another embodiment, the adhesive sheet, wherein the modified polymer (A) comprises an olefin based modified polymer.

The present invention provides, in a preferred embodiment, the adhesive sheet, wherein the modified polymer (A) comprises a modified polymer based on a copolymer of ethylene with at least one other olefin, as defined below.

The present invention provides, as a more preferred embodiment, the adhesive sheet, wherein the polyolefin (B) has a chemical structure derived from propylene.

The present invention provides, as a most preferred embodiment, the adhesive sheet, wherein the adhesive layer is bonded to an adherend through an adhesive auxiliary layer.

The present invention provides, in another aspect, a laminate obtainable by using the adhesive sheet.

Effects of the Invention

The adhesive sheet according to the present invention comprises a hot-melt type adhesive layer, wherein the hot-melt type adhesive layer comprises a modified polymer (A) to which a functional group is given, and a polyolefin (B). Therefore, it becomes possible for the adhesive sheet to adhere to various adherends, and thus the adhesive becomes less likely to squeeze out from an adherend in thermal fusion bonding and sealing of the adherend.

When the adhesive sheet of the present invention comprises a modified polymer (A) to which a functional group containing silicon is given, adhesion to an adherend is further improved without being affected by the material of the adherend.

When the modified polymer (A) comprises an olefin based modified polymer, the adhesive sheet according to the present invention is more excellent in insulating properties while maintaining the adhesion to an adherend, and is therefore suited as an adhesive sheet for electric instruments.

When the modified polymer (A) comprises a modified polymer based on a copolymer of ethylene with the other olefin, the adhesive sheet of the present invention is more excellent in adhesion to an adherend and is also more excellent in insulating properties, and is therefore more suited as an adhesive sheet for electric instruments.

When the polyolefin (B) has a chemical structure derived from propylene, the adhesive sheet of the present invention becomes less likely to squeeze out from an adherend in thermal fusion bonding and sealing of the adherend.

When the adhesive layer is bonded to an adherend through an adhesive auxiliary layer, the adhesive sheet of the present invention becomes suited for electric instrument applications since the adhesion to an adherend, particularly an imide film, is improved.

The laminate of the present invention is not affected by the material of the adherend, and also the adhesive layer does not squeeze out from the adherend, since the laminate is obtainable by using the above adhesive sheet.

MODE FOR CARRYING OUT THE INVENTION

Embodiments of the present invention will be described in detail below with reference to the accompanying drawings.

An adhesive sheet according to the present invention comprises a hot-melt type adhesive layer. There is no particular limitation on the adhesive layer as long as it is a sheet-like (or layer-like) adhesive layer which is solid at normal temperature, and exhibits fluidity when heated, and is solidified by cooling again, and thus adhering, and which comprises, as essential components, a modified polymer (A) to which a cross-linkable group is given (hereinafter also referred to as a "modified polymer (A)") and a polyolefin (B), and also enables production of the objective adhesive sheet of the present invention.

The adhesive sheet may optionally comprise a core material so as to ensure excellent self-standing properties, and also may comprise an adhesive auxiliary layer which can serve to enhance adhesion to an adherend.

Figure 1:
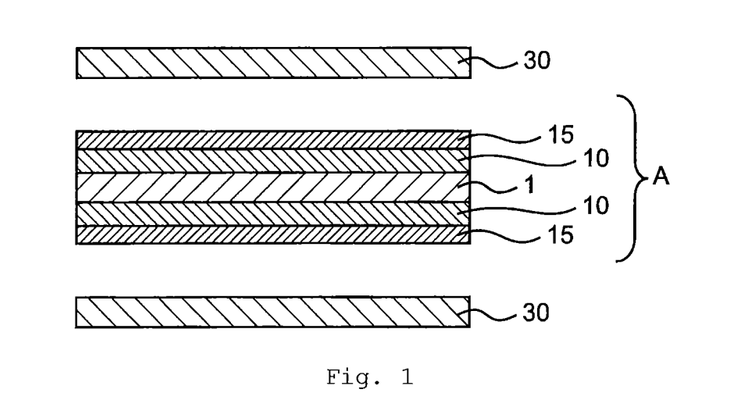
FIG. 1 is a schematic sectional view showing an embodiment of an adhesive sheet according to the present invention.

FIG. 1 is a schematic sectional view showing an embodiment of the adhesive sheet according to the present invention. An adhesive sheet A is a sheet-like laminate comprising a core material 1, adhesive layers 10, and adhesive auxiliary layers 15, the two adhesive layers 10 being disposed on both surfaces of the core material 1, and the adhesive auxiliary layers 15 being disposed on each of the two adhesive layers. In FIG. 1, adherends 30 are disposed on and under the adhesive sheet A, and each of the adherends 30 is bonded to the adhesive sheet A through each of the adhesive auxiliary layers 15.

Figure 2:
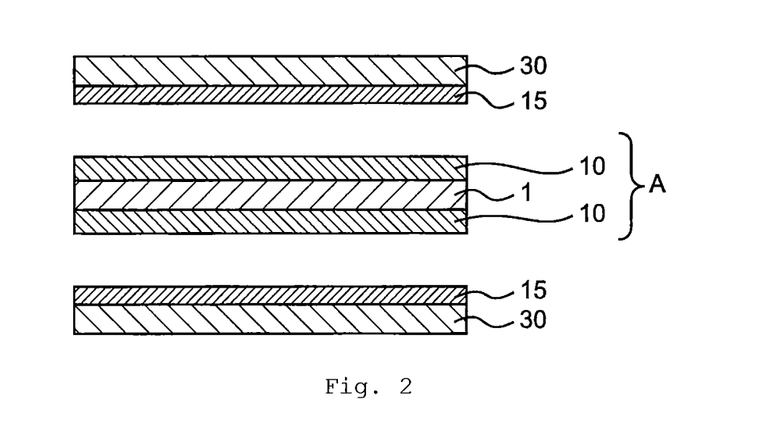
FIG. 2 is a schematic sectional view showing another embodiment of an adhesive sheet.

FIG. 2 is a schematic sectional view showing another embodiment of the adhesive sheet according to the present invention. An adhesive sheet A comprises a core material 1 and adhesive layers 10, but comprises no adhesive auxiliary layer 15. That is, the adhesive sheet A is a sheet-like laminate in which the two adhesive layers 10 are disposed on both surfaces of the core material 1. In FIG. 2, adherends 30 each of which comprises an adhesive auxiliary layer 15 are disposed on and under the adhesive sheet A, and each of the adherends 30 is bonded to the adhesive sheet A through each of the adhesive auxiliary layers 15.

Figure 3:
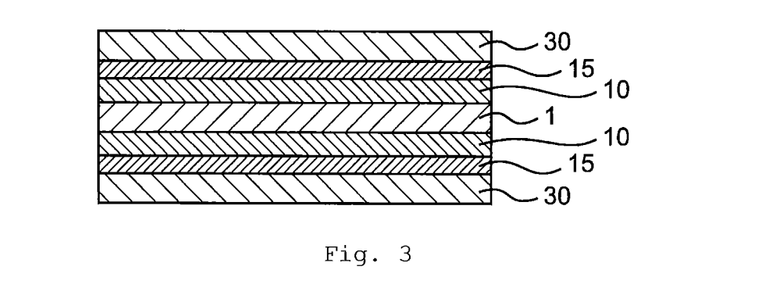
FIG. 3 is a schematic sectional view showing an example of an embodiment of the use of an adhesive sheet according to the present invention.

FIG. 3 is a schematic sectional view showing an embodiment of use of the adhesive sheet according to the present invention. The above-mentioned laminate obtainable by bonding the adhesive sheet to the adherend in FIG. 1 consequently becomes the same laminate as that obtainable by bonding the adhesive sheet to the adherend in FIG. 2. That is, the adherends 30 are bonded to both surfaces of the core material 1 through the adhesive layers 10 and the adhesive auxiliary layers 15.

Figure 4:
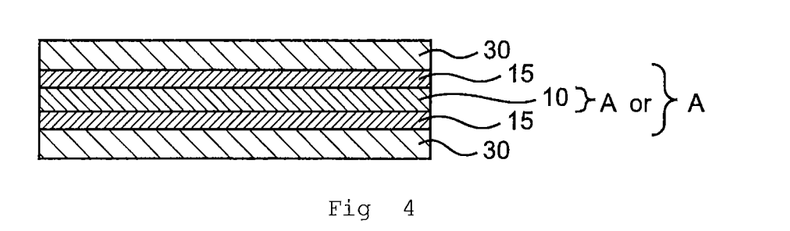
FIG. 4 is a schematic sectional view showing another embodiment of an adhesive sheet.

FIG. 4 is a schematic view showing still another embodiment of the adhesive sheet according to the present invention, and an embodiment of the use thereof. An adhesive sheet A is a laminate of only an adhesive layer 10, or a laminate in which adhesive auxiliary layers 15 are disposed on both surfaces of the adhesive layer 10. A laminate, in which the adhesive auxiliary layers 15 are disposed on adherends 30 or not, is used according to the presence or absence of the adhesive auxiliary layers 15 of the adhesive sheet A. This adhesive sheet A has a feature that it does not comprise a core material 1.

In FIGS. 1 to 4, the adhesive layer 10 is bonded to adherends 30 through adhesive auxiliary layers 15, and may be bonded directly to the adherends 30 without using the adhesive auxiliary layers 15.

FIG. 5 is a schematic sectional view showing another embodiment of use of the adhesive sheet according to the present invention. An adherend 30 is processed into a bag shape and contains an electrolytic solution 20 therein. In FIG. 5, only the end (or mouth) portion of the bag-shaped adherend 30 is shown. The end of the adherend 30 is sealed with an adhesive sheet A so as not to leak the electrolytic solution 20.

In the present invention, the modified polymer (A) to which a cross-linkable group is given means a polymer modified by giving a cross-linkable group to a base polymer.

In the present invention, it is possible to use, as a method for producing the modified polymer (A) to which a cross-linkable group is given, a production method in which the cross-linkable group is given to the base polymer without particular limitation. Such method includes, for example, (i) a method in which the base polymer is produced first, and then the cross-linkable group is given to the base polymer, and (ii) a method in which the cross-linkable group is simultaneously given using a monomer having a cross-linkable group while producing the base polymer by polymerizing a monomer.

The "base polymer" to which a cross-linkable group is given is not particularly limited as long as the objective adhesive sheet of the present invention can be obtained, and preferably comprises an olefin based polymer.

Herein, examples of the "olefin based polymer" include polyolefin (1), and a copolymer of an olefin with the other monomer having an ethylenic double bond (2).

There is no particular limitation on the "polyolefin (1)" as long as the objective adhesive sheet of the present invention can be obtained. The polyolefin includes, for example, homopolymers of an olefin, such as polyethylene, polypropylene, polybutene, polyoctene, and polyisobutylene, "copolymers of ethylene with the other olefin", and "copolymers of other olefins".

Specific examples of the "other olefin" include propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, and 2,3-dimethyl-2-butene.

The "other olefin" is preferably an olefin having 3 to 10 carbon atoms, more preferably propylene, butene, and octene, and particularly preferably butene and propylene.

The copolymer of ethylene with the other olefin includes, for example, a copolymer of ethylene with octene, a copolymer of ethylene with propylene and butene, a copolymer of ethylene with propylene, and a copolymer of ethylene with butene. These copolymers may be used alone or in combination.

In the present invention, the copolymer of ethylene with the other olefin is most preferably a copolymer of ethylene with propylene and butene.

There is no particular limitation on the "copolymer of olefin with the other monomer having an ethylenic double bond (2)" as long as the objective adhesive sheet of the present invention can be obtained. The olefin was previously mentioned. The "other monomer having an ethylenic double bond" refers to a monomer other than the olefin and has a double bond between carbon atoms, capable of addition-polymerizing with the olefin. The "other monomer having an ethylenic double bond" includes, for example, a carboxylic acid derivative having an ethylenic double bond, styrene, vinyl ether, and vinyl chloride.

The "carboxylic acid derivative having an ethylenic double bond" refers to a carboxylic acid derivative having a double bond between carbon atoms, capable of addition-polymerizing with ethylene, and includes, for example, a "carboxylic acid having an ethylenic double bond", a "carboxylic anhydride having an ethylenic double bond", and a "carboxylic acid ester having an ethylenic double bond".

There is no particular limitation on the "carboxylic acid having an ethylenic double bond" as long as it is a compound having an ethylenic double bond and a carboxyl group and the hot-melt adhesive of the present invention can be obtained. Specific examples thereof include oleic acid, linoleic acid, maleic acid, acrylic acid, and methacrylic acid.

There is no particular limitation on the "carboxylic anhydride having an ethylenic double bond" as long as it is a compound obtained by dehydration condensation of two carboxylic acid and the hot-melt adhesive of the present invention can be obtained. Specific examples thereof include fumaric anhydride and maleic anhydride.

The "carboxylic acid ester having an ethylenic double bond" includes, for example, an unsaturated fatty acid alkyl ester and a carboxylic acid unsaturated alkyl ester.

The "unsaturated fatty acid alkyl ester" includes, for example, (meth)acrylic acid esters such as methyl acrylate, butyl acrylate, 2-ethylhexyl acrylate, and methyl methacrylate, and the "carboxylic acid unsaturated alkyl ester" includes, for example, vinyl acetate and allyl acetate.

These carboxylic acid derivatives having an ethylenic double bond can be used alone or in combination.

The carboxylic acid derivative having an ethylenic double bond is preferably vinyl acetate, methyl methacrylate, and butyl acrylate, and particularly preferably "methyl methacrylate".

In the present invention, glycidyl(meth)acrylate corresponds to a monomer to which a cross-linkable group is given, and is distinguished from previously mentioned carboxylic acid ester.

The glycidyl(meth)acrylate is commonly produced by three types of methods shown below:

a method in which (meth)acrylic acid is reacted with epichlorohydrin in the presence of a quaternary ammonium salt to obtain 3-chloro-2-hydroxypropyl ester of (meth)acrylic acid, and then the obtained ester is subjected to the removal of hydrogen chloride with an alkali (first method);

a method in which methyl(meth)acrylate and glycidol are subjected to an ester exchange reaction in the presence of a basic catalyst (second method); and a method in which (meth)acrylic acid is reacted with an alkali metal to obtain an alkali metal salt of (meth)acrylic acid, and then the obtained alkali metal salt is reacted with epichlorohydrin in the presence of a quaternary ammonium salt, thereby removing an alkali chloride (third method).

In the present invention, the base polymer is preferably a polyolefin. Taking account of the use of the modified polymer (A) to which a cross-linkable group is given in electric instruments, the polyolefin is more suited as the base polymer as compared with the "copolymer of an olefin with the other monomer having an ethylenic double bond" since it has more excellent insulating properties.

The "modified polymer" according to the present invention more specifically means, for example, a polymer modified by giving a cross-linkable group to the above-mentioned base polymer, and the "olefin based modified polymer" means a polymer modified by giving a cross-linkable group to the olefin based polymer. Therefore, the modified polymer (A) preferably comprises an olefin based modified polymer. Furthermore, the modified polymer (A) preferably comprises a modified polymer based on a copolymer of ethylene with the other olefin.

In the present invention, examples of the "cross-linkable group" which is given to the base polymer include a functional group containing silicon (Si), an acid anhydride group, a carboxyl group, an amino group, an imino group, a hydroxyl group, and an epoxy group.

Examples of the functional group containing silicon (Si) include an alkoxysilyl group, a silanol group, and a silyl ether group, and examples of the epoxy group include a glycidoxy group and a 3,4-epoxycyclohexyl group.

Among these cross-linkable groups, the functional group containing silicon (Si) is preferable, and the alkoxysilyl group is more preferable. The alkoxysilyl group includes, for example, a trimethoxysilyl group, a triethoxysilyl group, and a dimethoxymethylsilyl group, and a trimethoxysilyl group is particularly preferable.

In the present invention, it is possible to exemplify, as a preferred embodiment of the modified polymer (A) to which a cross-linkable group is given, a modified polymer to which a functional group containing silicon is given, and preferably an olefin based modified polymer to which a functional group containing silicon is given. More specifically, the modified polymer is more preferably a modified polyolefin to which an alkoxysilyl group is given, particularly preferably a modified polymer based on a copolymer of ethylene with the other olefin to which an alkoxysilyl group is given, and most preferably a modified copolymer of ethylene with propylene and butene to which an alkoxysilyl group is given. Examples of the modified copolymer of ethylene with propylene and butene to which an alkoxysilyl group is given include VESTOPLAST EP2412 (trade name), VESTOPLAST EP2403 (trade name), and VESTOPLAST 206 (trade name), which are commercially available.

The ethylene-glycidyl(meth)acrylate copolymer is obtainable by copolymerizing glycidyl(meth)acrylate with ethylene. Herein, it is included in the modified polymer (A) to which a cross-linkable group is given, regarding it as a polymer modified by giving a cross-linkable group such as a glycidyl group to a copolymer of ethylene (that is, olefin based polymer).

Herein, there is no particular limitation on the polyolefin (B) as long as the objective adhesive sheet of the present invention can be obtained, and the polyolefin (B) may be a common polyolefin. The polyolefin (B) may be either a homopolymer of an olefin, or a copolymer of an olefin, and specific examples thereof include polyethylene, polypropylene, polybutene, polypentene, polyhexene, polyheptene, polyoctene, polybutene, polyisobutylene, an ethylene-propylene copolymer, and an ethylene-butene copolymer. The polyolefin (B) is more preferably an elastomer, and still more preferably an elastomer (rubbery elastic body) of the exemplified polyolefin. Among these polyolefins, polypropylene is particularly preferable.

Therefore, in the present invention, the polyolefin (B) is preferably a polyolefin having a chemical structure derived from propylene (that is, repeating unit based on propylene).

The polyolefin (B) is more preferably a thermoplastic elastomer. When the polyolefin (B) is a thermoplastic elastomer, an adhesive layer 10 becomes less likely to squeeze out from an adherend 30 in thermal fusion bonding of an adhesive sheet A together with the adherend. Therefore, in the present invention, most preferred embodiment of the polyolefin (B) is a polypropylene elastomer. Examples of a commercially available product of the polypropylene elastomer include Vistamaxx 6202 (manufactured by Exxon Mobil Corporation).

The hot-melt type adhesive layer may further contain various additives, if necessary. The various additives include, for example, waxes, tackifier resins, plasticizers, stabilizers (ultraviolet absorbers, antioxidants), and fine particle fillers.

The "wax" may be a wax which is usually used in the hot-melt adhesive, and specific examples thereof include a paraffin wax, a polyethylene wax, a polyethylene oxide wax, a polypropylene wax, a microcrystalline wax, and a Fischer-Tropsch wax.

There is no particular limitation on the "tackifier resin" as long as it is usually used in the hot-melt adhesive and the objective adhesive sheet of the present invention can be obtained.

Examples of the tackifier resin include, a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, a hydrogenated derivative of a copolymer of a hydrogenated terpene, a polyterpene resin, a hydrogenated derivative of a phenol based modified terpene resin, an aliphatic petroleum hydrocarbon resin, a hydrogenated derivative of an aliphatic petroleum hydrocarbon resin, an aromatic petroleum hydrocarbon resin, a hydrogenated derivative of an aromatic petroleum hydrocarbon resin, a cyclic aliphatic petroleum hydrocarbon resin, and a hydrogenated derivative of a cyclic aliphatic petroleum hydrocarbon resin. These tackifier resins can be used alone or in combination. A liquid type tackifier resin can also be used as long as it has a colorless to pale yellow color tone and is substantially free from odor, and also has satisfactory thermal stability. Taking these characteristics into consideration comprehensively, the hydrogenated derivatives of the above-mentioned resins are preferable as the tackifier resin.

Commercially available products can be used as the tackifier resin. Examples of the commercially available products include ECR5600 (trade name) manufactured by Exxon Mobil Corporation; MARUKACLEAR H (trade name) manufactured by Maruzen Petrochemical CO, LTD.; CLEARON K100 (trade name) manufactured by YASUHARA CHEMICAL CO., LTD.; ALKON M100 (trade name) manufactured by Arakawa Chemical Industries, Ltd.; I-MARV S100 (trade name), I-MARV Y135 (trade name) and I-MARV P125 (trade name) manufactured by Idemitsu Petroleum Chemical Co., Ltd.; CLEARON K4090 (trade name) and CLEARON K4100 (trade name) manufactured by YASUHARA CHEMICAL CO., LTD.; ECR231c (trade name) and ECR179EX (trade name) manufactured by Exxon Mobil Corporation; and RIGARITE R7100 (trade name) and EASTOTAC C-100W (trade name) manufactured by Eastman Chemical Company. These commercially available tackifier resins can be used alone or in combination.

There is no particular limitation on the "plasticizer" as long as it is mixed for the purpose of decreasing a melt viscosity of a hot-melt adhesive, imparting flexibility and improving wetting to an adherend, and also the objective hot-melt adhesive according to the present invention can be obtained. Examples of the plasticizer include paraffin based oil, naphthene based oil, and aromatic based oil. Colorless and odorless paraffin based oil is particularly preferable.

Commercially available products can be used as the plasticizer. Examples thereof include White Oil Broom 350 (trade name) manufactured by Kukdong Oil & Chemical Co. Ltd.; Diana Frecia S32 (trade name), Diana Process Oil PW-90 (trade name) and DN Oil KP-68 (trade name) manufactured by Idemitsu Kosan Co., Ltd.; Enerper M1930 (trade name) manufactured by BP Chemicals Ltd.; and, Kaydol (trade name) manufactured by Crompton Corporation. These plasticizers can be used alone or in combination.

The "stabilizer" is mixed so as to improve stability of the hot-melt adhesive by preventing decrease in molecular weight due to heat, air and light, as well as the occurrence of gelation, coloration, and odor of the hot-melt adhesive. There is no particular limitation on the stabilizer as long as the objective hot-melt adhesive of the present invention can be obtained. Examples of the stabilizer include an antioxidant and an ultraviolet absorber.

The "ultraviolet absorber" is used so as to improve light resistance of the hot-melt adhesive. The "antioxidant" is used so as to improve oxidative degradation of the hot-melt adhesive. There is no particular limitation on the antioxidant and ultraviolet absorber as long as they are commonly used in the hot-melt adhesive.

Examples of the "antioxidant" include a phenol based antioxidant, a sulfur based antioxidant, and a phosphorus based antioxidant. Examples of the ultraviolet absorber include a benzotriazole based ultraviolet absorber and a benzophenone based ultraviolet absorber. A lactone based stabilizer can also be added. These antioxidants and ultraviolet absorbers can be used alone or in combination.

It is possible to use, as the "stabilizer", commercially available products. Examples thereof include SUMILIZER GM (trade name), SUMILIZER TPD (trade name) and SUMILIZER TPS (trade name) manufactured by Sumitomo Chemical Co., Ltd.; IRGANOX 1010 (trade name), IRGANOX HP2225FF (trade name), IRGAFOS 168 (trade name) and IRGANOX 1520 (trade name) manufactured by BASF Corporation; ADK STAB AO-60 (trade name) manufactured by ADEKA Corporation; and, JF77 (trade name) and JP-650 (trade name) manufactured by Johoku Chemical Co., Ltd. These stabilizers can be used alone or in combination.

The hot-melt adhesive type layer of the present invention can further contain a fine particle filler. There is no particular limitation on the fine particle filler as long as it is commonly used and the objective adhesive sheet of the present invention can be obtained. Examples of the "fine particle filler" include mica, calcium carbonate, kaolin, talc, titanium oxide, diatomaceous earth, urea based resin, styrene beads, baked clay, and starch. The shape of these fine particle fillers is preferably spherical. There is no particular limitation on the size (diameter in case of a spherical shape).

The hot-melt adhesive type layer is producible by known technology. Typically, the hot-melt type adhesive is produced by melting and mixing an olefin based modified polymer (A) and a polyolefin (B) at a temperature of about 100 to 200° C. for 0.5 to 2 hours until both the components are homogeneously blended. There is no particular limitation on the mixing method. Various additives such as a wax, a tackifier resin, an antioxidant, and/or a plasticizer are preferably mixed together when the component (A) is mixed with the component (B), or may be added after uniformly mixing the component (A) with the component (B).

The hot-melt type adhesive may directly form an adhesive layer as it is, or may be applied to a core material 1 to form an adhesive layer 10. There is no particular limitation on the coating method, and the coating method may be a conventional coating method of a hot-melt adhesive.

The core material 1 can take forms such as a woven fabric, a nonwoven fabric, a film, and a sheet, and is preferably obtainable by forming polyolefin, polyester, or polyamide into a sheet shape. When a lithium battery packing material is sealed with an adhesive sheet A, a core material 1 having insulating properties is preferably used.

There is no particular limitation on the adhesive auxiliary layer 15 as long as a material used commonly as a primer of an adherend is formed into a layer shape and the objective adhesive sheet of the present invention can be obtained. The adhesive auxiliary layer 15 includes, for example, a layer of a silane coupling agent, a (meth)acrylic resin, a polyurethane, or a modified polyolefin, and is preferably a layer of a silane coupling agent. The adhesive auxiliary layer may be a layer of a material alone, or a combination of two or more types of materials. The adhesive auxiliary layer 15 may be formed on the adherend 30, or may be formed on the adhesive layer 10. The adhesive auxiliary layer 15 can improve adhesion between the adhesive layer 10 and the adherend 30 more preferably. Since the adhesion between the adhesive layer 10 and the adherend 30 is improved, the adhesive sheet A of the present invention can be more preferably applied to various adherends 30.

It is possible to use, as a silane coupling agent, (meth) acryloxyalkyltrialkoxysilanes, (meth)acryloxyalkylalkylalkoxysilanes, aminoalkylalkoxysilanes, vinyltrialkoxysilanes, vinylalkylalkoxysilanes, epoxysilanes, mercaptosilanes, and isocyanuratesilanes. However, the silane coupling agent is not limited only to these silane compounds.

Examples of the "(meth)acryloxyalkyltrialkoxysilanes" include 3-(meth)acryloxypropyltrimethoxysilane, 3-(meth) acryloxypropyltriethoxysilane, 4-(meth)acryloxyethyltrimethoxysilane, and 3-(meth)acryloxypropyltrimethoxysilane.

Examples of the "(meth)acryloxyalkylalkylalkoxysilanes" include 3-(meth)acryloxypropylmethyldimethoxysilane, 3-(meth)acryloxypropylmethyldiethoxysilane, 3-(meth)acryloxypropylethyldiethoxysilane, and 3-(meth) acryloxyethylmethyldimethoxysilane.

Examples of the "aminoalkylalkoxysilanes" include 3-(2-aminoethylamino)propyltrimethoxysilane and 3-(2-aminoethylamino)propyldimethoxymethylsilane.

Examples of the "vinyltrialkoxysilanes" include vinyltrimethoxysilane, vinyltriethoxysilane, vinyldimethoxyethoxysilane, vinyltri(methoxyethoxy)silane, and vinyltri (ethoxymethoxy)silane.

Examples of the "vinylalkylalkoxysilanes" include vinylmethyldimethoxysilane, vinylethyldi(methoxyethoxy)silane, vinyldimethylmethoxysilane, and vinyldiethyl (methoxyethoxy)silane.

It is possible to classify the "epoxysilanes" into a glycidyl based silane and an epoxycyclohexyl based silane. The "glycidyl based silane" has a glycidoxy group, and specific examples thereof include 3-glycidoxypropylmethyldiisopropenoxysilane, 3-glycidoxypropyltrimethoxysilane, 3-glycidoxypropyltriethoxysilane, and 3-glycidoxypropyldiethoxysilane.

The "epoxycyclohexyl based silane" has a 3,4-epoxycyclohexyl group, and specific examples thereof include 2-(3, 4-epoxycyclohexyl)ethyltrimethoxysilane and 2-(3,4-epoxycyclohexyl)ethyltriethoxysilane.

Examples of the "mercaptosilanes" include 3-mercaptopropyltrimethoxysilane and 3-mercaptopropyltriethoxysilane.

Examples of the "isocyanuratesilanes" include tris(3-(trimethoxysilyl)propyl)isocyanurate.

The adhesive auxiliary layer 15 can contain, in addition to the above silane compounds, a further component. Examples of said further component include a modified polyolefin to which a polar functional group is given, and a copolymer of ethylene with a carboxylic acid derivative, modified by giving a polar functional group.

Examples of the "modified polyolefin to which a polar functional group is given" include a modified polyolefin to which an acid anhydride group is given, and a modified polyolefin to which a carboxyl group is given.

Examples of the "copolymer of ethylene with a carboxylic acid derivative, modified by giving a polar functional group" include ethylene-glycidyl(meth)acrylate.

The silane compound is preferably contained in the amount of 1% by weight or more, and particularly preferably 1 to 70% by weight, based on 100 parts by weight of the total weight of the adhesive auxiliary layer 15.

Examples of the adherend 30 include, but are not particularly limited to, plastic, metal, wood material, and plywood.

Examples of the plastic include polyolefins, such as polyethylene and polypropylene, polyethylene terephthalate, and polyimide. Examples of the metal include aluminum and copper. The adherend 30 may be in any form such as film, tape or plate.

There is no particular limitation on the method for producing the adhesive sheet A as long as the objective adhesive sheet of the present invention can be obtained, and the adhesive sheet is producible using an already known production method. Using an already known method, an the adhesive layer 10 can be optionally formed on the core material 1, and the adhesive auxiliary layer 15 can be formed on the adhesive layer 10. There is no particular limitation on the coating method, and commonly known contact coating and non-contact coating methods are used. The "contact coating" method refers to an application method in which a dispenser is brought into contact with a member or a film in the case of applying a hot-melt adhesive, whereas, the "non-contact coating" method refers to an application method in which a dispenser is not brought into contact with a member or a film in the case of applying a hot-melt adhesive. Examples of the contact coating method include a slot coater coating method and a roll coater coating method. Examples of the non-contact coating method include a spiral coating method capable of spiral coating; omega coating and control seam coating methods capable of wavy coating; slot spray coating and curtain spray coating methods capable of planar coating; a dot coating method capable of spot-like coating; and, a bead coating method capable of linear coating.

The adhesive sheet comprises an optional core material 1, a hot-melt type adhesive layer 10, and an optional adhesive auxiliary layer 15, and is obtainable by being formed into a sheet shape. The adhesive sheet is formed by the method similar to the coating method of a hot-melt adhesive.

The adhesive sheet according to the present invention is widely used, for example, in electric instruments, woodworking, building materials, medical supplies, and paper products, and can be preferably used so as to produce electric instruments and is useful as an adhesive sheet for electric instruments.

The laminate according to the present invention refers to a laminate produced by using the above adhesive sheet and comprises a hot-melt type adhesive layer and an adherend layer, and sometimes comprises a core material and/or an adhesive auxiliary layer. There is no particular limitation on the type of the laminate as long as it is producible using the above adhesive sheet, and examples thereof include an electric instrument, a medical tape, an industrial tape, a sheet, a portable body warmer, a patch, a seal, a label, a name plate, a reclosable fastener, an outdoor building material, a corrugated cardboard, and a carton.

The "electric instrument" is preferably a packing material of a battery or a capacitor in the present invention. In this case, an adherend is a plastic film such as a polyimide film, and the adherend (polyimide film) packs an electrolytic solution. The adhesive layer is preferably bonded to the adherend through an adhesive auxiliary layer.

The "medical tape" includes both a percutaneous absorption product containing a drug, and a mere tape containing no drug.

As used herein, the "industrial tape" refers to a so-called sealing tape or masking tape. It is often used in adherends such as metals, plastics, and inorganic materials.

When the "portable body warmer" is produced, the core material is a film such as a polyester film, or a nonwoven fabric, and the adherend is clothing obtainable by using cotton, wool, silk, rayon, and polyester as raw materials.

When the "label" is produced, the adherend is a bottle (glass), a can (metal), or a plastic, and the label is affixed to these adherends; the label is thus applicable to beverage applications.

Main embodiments of the present invention are defined below.

1. An adhesive sheet comprising a hot-melt type adhesive layer, wherein the hot-melt type adhesive layer comprises a modified polymer (A) to which a cross-linkable group is given, and a polyolefin (B).
2. The adhesive sheet according to the above 1, wherein the hot-melt type adhesive layer comprises a modified polymer (A) to which a functional group containing silicon is given.
3. The adhesive sheet according to the above 1 or 2, wherein the modified polymer (A) comprises an olefin based modified polymer.
4. The adhesive sheet according to any one of the above 1 to 3, wherein the modified polymer (A) comprises a modified polymer based on a copolymer of ethylene with at least one other olefin.
5. The adhesive sheet according to any one of the above 1 to 4, wherein the polyolefin (B) has a chemical structure derived from propylene.
6. The adhesive sheet according to any one of the above 1 to 5, wherein the adhesive layer is bonded to an adherend through an adhesive auxiliary layer.
7. A laminate obtainable by using the adhesive sheet according to any one of the above 1 to 6.

EXAMPLES

The present invention will be described in detail by way of Examples and Comparative Examples, but these Examples are for illustrative purpose only and are not to be construed restrictively.

Components used to produce adhesive sheets are shown below.

(A) Modified polymer to which a cross-linkable group is given (A1) Modified amorphous poly-α-olefin to which a functional group containing silicon is given (ethylene-propylene-butene copolymer) (glass transition temperature: −29° C., softening point: 100° C., melt viscosity at 190° C.: 12,000 mPa·s, VESTOPLAST EP2412 (trade name) manufactured by Evonik Degussa Corporation)

(A2) Ethylene-glycidyl methacrylate copolymer (glycidyl methacrylate content: 19% by weight, melt viscosity at 190° C.: 33,000 mPa·s, BONDFAST CG5001 (trade name) manufactured by Sumitomo Chemical Co., Ltd.)

(A3) Maleic anhydride modified polyolefin (propylene based polymer) (softening point: 107° C., melt viscosity at 190° C.: 17,000 mPa·s, US-1035 (trade name) manufactured by Seiko PMC Corporation)

(A4) Modified polyisobutylene to which a functional group containing silicon (dimethoxymethylsilyl group) is given (melt viscosity at 190° C.: 170 mPa·s, Epion EP100S (trade name) manufactured by Kaneka Corporation)

(A') Polymer to which no cross-linkable group is given (A'5) Ethylene-vinyl acetate copolymer (vinyl acetate content: 28% by weight, melt viscosity at 190° C.: 23,000 mPa·s, ULTRASEN 722 (trade name) manufactured by TOSOH CORPORATION)

(A'6) Copolymer of ethylene with propylene and 1-butene (glass transition temperature: −28° C., softening point: 124°

C., melt viscosity at 190° C.: 8,000 mPa·s, VESTOPLAST 708 (trade name) manufactured by Evonik Degussa Corporation)

(A'7) Acrylic resin (melt viscosity at 190° C.: 620,000 mPa·s, DIANAL BR113 (trade name) manufactured by MITSUBISHI RAYON CO., LTD.)

(A'8) Ethylene-methyl methacrylate copolymer (methyl methacrylate content: 28% by weight, melt viscosity at 190° C.: 1,900 mPa·s, ACRYFT CM5021 (trade name) manufactured by Sumitomo Chemical Co., Ltd.

(B) Polyolefin (B1) Polypropylene base elastomer (melt viscosity at 190° C.: 1,200,000 mPa·s, Vistamaxx 6202 (trade name) manufactured by Exxon Mobil Corporation)

(B2) Ethylene-octene block polymer (melt viscosity at 190° C.: 750,000 mPa·s, Infuse 9817 (trade name) manufactured by The Dow Chemical Company)

(B3) Polypropylene (melt viscosity at 190° C.: 800,000 mPa·s, PM490M (trade name) manufactured by SunAllomer Ltd.)

(C) Wax (C1) Crystalline propylene-ethylene wax (melt viscosity at 190° C.: 3,600 mPa·s, LICOCENE PP2602 (trade name) manufactured by Clariant Corporation)

(C2) Crystalline polypropylene wax (number average molecular weight: 4,000, softening point: 150° C., penetration: 1 or less, melt viscosity at 190° C.: 140 mPa·s, melting point: 140° C., Hi-WAX NP105 (trade name) manufactured by Mitsui Chemicals, Inc.)

(D) Tackifier Resin (D1) Cyclic aliphatic petroleum resin (number average molecular weight: 1,900, softening point: 100° C., melt viscosity at 190° C.: 200 mPa·s, EASTOTAC C-100 W (trade name) manufactured by Eastman Chemical Company)

These components were added in the proportions (parts by weight) shown in Tables 1 and 3. Using a universal stirrer, the respective components were melted and mixed at about 170° C. over about 1 hour to produce hot-melt adhesives of Examples 1 to 10, and Comparative Examples 1 to 5.

These hot-melt adhesives were formed into sheets to produce adhesive sheets each comprising a hot-melt type adhesive layer, and then properties of these adhesive sheets were evaluated.

Adhesion (Production of Samples)

Using a heated roller, each hot-melt adhesive was rolled to obtain an adhesive sheet having a thickness of 30 μm. The obtained adhesive sheet was interposed between two adherends of 5 cm square, followed by pressing and heating using a hot press adjusted to a temperature of 120° C. and a pressure of 0.3 MPa for 3.5 minutes to obtain a laminate. After cooling, the obtained laminate was cut into pieces of 1 cm in width to obtain a sample.

As the adherend, a polyethylene terephthalate (PET) film (50 μm in thickness), an undrawn polypropylene (CPP, 40 μm in thickness), an aluminum sheet (50 μm in thickness), a plywood (about 2 mm in thickness), a polyimide film (25 μm in thickness), and a polyimide film surface-treated with a silane coupling agent having an amino group (25 μm in thickness) were used.

Each of the samples thus produced was peeled by hand, and a state of the peeled surface was evaluated by visual observation.

(Evaluation Criteria)

A: An adhesive layer satisfactorily adhered to an adherend, and a cohesive fracture was recognized on a peeled surface.

B: Although an adhesive layer satisfactorily adhered to an adherend, bonded interfacial fracture was recognized on a peeled surface.

C: Although an adhesive layer satisfactorily adhered to an adherend, peeling easily occurred.

D: An adhesive layer did not adhere to an adherend.

Workability, Blocking Resistance (Production of Samples)

One surface of a PET film (50 μm in thickness) was coated with a hot-melt adhesive at a thickness of 30 μm to form an adhesive layer, and the obtained laminate was used as an adhesive sheet. In the same manner, another adhesive sheet was produced. These two adhesive sheets were laminated to each other by hand in a state where the adhesive layers are laid one upon another at normal temperature for 5 seconds. Thereafter, the two adhesive sheets were peeled by hand and then surface tackiness was evaluated based on a state in peeling.

(Evaluation Criteria)

A: Two adhesive sheets did not adhere to each other.

B: Two adhesive sheets were easily peeled at an interface between the two adhesive layers.

C: In peeling of two adhesive sheets, any one of the adhesive sheets was partially broken.

D: Two adhesive sheets could not be peeled.

Workability, Squeeze-Out Properties (Production of Samples)

A 30 μm thick sheet-like hot-melt type adhesive layer (adhesive sheet) was interposed between two PET films (50 μm in thickness), followed by cutting into pieces in size of 5 cm square to obtain samples.

(Evaluation Procedure)

A hot press was adjusted to a temperature of 150° C. and a pressure of 0.3 MPa, and each of the above samples was allowed to undergo thermocompression bonding for 5 minutes. The amount of a hot-melt type adhesive layer (adhesive sheet) squeezed out from a PET film was measured, and then squeeze-out properties of the adhesive layer were evaluated.

B: Maximum squeeze-out amount is less than 2 mm.

C: Squeeze-out amount is 2 mm or more, but up to and including 5 mm.

D: Squeeze-out amount is more than 5 mm.

TABLE 1

| | Examples | | | | |
|---|---|---|---|---|---|
| | 1 | 2 | 3 | 4 | 5 |
| (A1) | 25 | 15 | 50 | 25 | 25 |
| (A2) | — | — | — | — | — |
| (A3) | — | — | — | — | — |
| (A4) | — | — | — | — | — |
| (A'5) | — | — | — | — | — |
| (A'6) | — | — | — | — | — |
| (A'7) | — | — | — | — | — |
| (A'8) | — | — | — | — | — |
| (B1) | 25 | 25 | 25 | 15 | 50 |
| (B2) | — | — | — | — | — |
| (B3) | — | — | — | — | — |
| (C1) | 25 | 25 | — | 25 | — |

TABLE 1-continued

|  |  | Examples | | | | |
| --- | --- | --- | --- | --- | --- | --- |
|  |  | 1 | 2 | 3 | 4 | 5 |
| (C2) |  | 15 | 20 | 15 | 25 | 15 |
| (D1) |  | 10 | 15 | 10 | 10 | 10 |
| Total of (A) to (D) |  | 100 | 100 | 100 | 100 | 100 |
| Adhesion | Adherend: PET | B | B | B | B | B |
| Adhesion | Adherend: CPP | A | A | A | A | A |
| Adhesion | Adherend: Aluminum | B | B | B | B | B |
| Adhesion | Adherend: Plywood | A | A | A | A | A |
| Adhesion | Adherend: Polyimide | B | C | B | C | B |
| Adhesion | Adherend: Treated polyimide | A | A | A | A | A |
| Workability | Blocking resistance | B | A | B | A | B |
| Workability | Squeeze-out properties | B | B | B | C | B |

TABLE 2

|  |  | Examples | | | | |
| --- | --- | --- | --- | --- | --- | --- |
|  |  | 6 | 7 | 8 | 9 | 10 |
| (A1) |  | 25 | 25 | — | — | — |
| (A2) |  | — | — | 25 | — | — |
| (A3) |  | — | — | — | 25 | — |
| (A4) |  | — | — | — | — | 25 |
| (A'5) |  | — | — | — | — | — |
| (A'6) |  | — | — | — | — | — |
| (A'7) |  | — | — | — | — | — |
| (A'8) |  | — | — | — | — | — |
| (B1) |  | — | — | 25 | 25 | 25 |
| (B2) |  | 25 | — | — | — | — |
| (B3) |  | — | 25 | — | — | — |
| (C1) |  | 25 | 25 | 25 | 25 | 25 |
| (C2) |  | 15 | 15 | 15 | 15 | 15 |
| (D1) |  | 10 | 10 | 10 | 10 | 10 |
| Total of (A) to (D) |  | 100 | 100 | 100 | 100 | 100 |
| Adhesion | Adherend: PET | B | B | C | B | A |
| Adhesion | Adherend: CPP | A | A | B | A | A |
| Adhesion | Adherend: Aluminum | B | B | B | B | C |
| Adhesion | Adherend: Plywood | A | A | A | A | A |
| Adhesion | Adherend: Polyimide | B | B | C | B | B |
| Adhesion | Adherend: Treated polyimide | A | A | C | A | B |
| Workability | Blocking resistance | B | B | A | B | B |
| Workability | Squeeze-out properties | B | B | B | B | B |

TABLE 3

|  |  | Comparative Examples | | | | |
| --- | --- | --- | --- | --- | --- | --- |
|  |  | 1 | 2 | 3 | 4 | 5 |
| (A1) |  | — | — | — | — | 50 |
| (A2) |  | — | — | — | — | — |
| (A3) |  | — | — | — | — | — |
| (A4) |  | — | — | — | — | — |
| (A'5) |  | 25 | — | — | — | — |
| (A'6) |  | — | 25 | — | — | — |
| (A'7) |  | — | — | 25 | — | — |
| (A'8) |  | — | — | — | 25 | — |
| (B1) |  | 25 | 25 | 25 | 25 | — |
| (B2) |  | — | — | — | — | — |
| (B3) |  | — | — | — | — | — |
| (C1) |  | 25 | 25 | 25 | 25 | 25 |
| (C2) |  | 15 | 15 | 15 | 15 | 15 |
| (D1) |  | 10 | 10 | 10 | 10 | 10 |
| Total of (A) to (D) |  | 100 | 100 | 100 | 100 | 100 |
| Adhesion | Adherend: PET | D | C | C | B | D |
| Adhesion | Adherend: CPP | A | A | B | A | B |
| Adhesion | Adherend: Aluminum | C | B | D | D | D |
| Adhesion | Adherend: Plywood | A | A | C | C | C |
| Adhesion | Adherend: Polyimide | D | D | D | C | D |
| Adhesion | Adherend: Treated polyimide | C | C | D | C | D |
| Workability | Blocking resistance | A | C | C | B | A |
| Workability | Squeeze-out properties | B | B | B | B | D |

As shown in Tables 1 and 2, the adhesive sheets of Examples 1 to 10 are excellent in adhesion to various adherends and in blocking resistance; further, the adhesive layers are less likely to squeeze out since the hot-melt adhesive layers comprise both a modified polymer (A) and a polyolefin (B).

In contrast, the adhesive sheets of Comparative Examples 1 to 4 shown in Table 3 are inferior in adhesion to adherends as compared with the adhesive sheets of Examples since the hot-melt adhesive layers do not comprise a modified polymer (A). In the adhesive sheet of Comparative Example 5, the adhesive layer squeezes out from an adherend since the hot-melt adhesive layer does not comprise a polyolefin (B).

INDUSTRIAL APPLICABILITY

The present invention provides an adhesive sheet. The adhesive sheet according to the present invention is used to produce a laminate useful in the fields of electric instruments, medical treatment, building materials, and paper processing. The adhesive sheet is suited for electric instrument applications and is particularly useful to seal a packing body of an electrolytic solution of a lithium battery.

DESCRIPTION OF REFERENCE NUMERALS

A: Adhesive sheet, 1: Core material, 10: Adhesive layer, 15: Adhesive auxiliary layer, 20: Electrolytic solution, 30: Adherend

What is claimed is:
1. An electric instrument comprising an electrolytic solution sealed within a laminate sheet; the laminate sheet comprising
    a first adherend film having a first surface;
    a first adhesive auxiliary layer having opposing first and second surfaces and selected from a layer of a silane coupling agent, a (meth)acrylic resin, a polyurethane and a modified polyolefin, the first adhesive auxiliary layer second surface directly contacting and bonded to the first adherend film first surface;

a hot-melt adhesive layer having opposing first and second surfaces, the hot melt adhesive layer second surface directly contacting and bonded to the first adhesive auxiliary layer first surface;

a second adhesive auxiliary layer having opposing first and second surfaces and selected from a layer of a silane coupling agent, a (meth)acrylic resin, a polyurethane and a modified polyolefin, the second adhesive auxiliary layer second surface directly contacting and bonded to the hot melt adhesive layer first surface;

a second adherend film having opposing first and second surfaces, the second adherend film second surface directly contacting and bonded to the second adhesive auxiliary layer first surface;

wherein the hot-melt adhesive layer comprises a modified polymer (A) to which a cross-linkable group is given and a thermoplastic elastomer polyolefin (B);

wherein the first adherend film and the second adherend film form a pouch with an interior space and an opening; the first adhesive auxiliary layer and the second adhesive auxiliary layer, respectively, directly contact and are bonded to the first adherend film and the second adherend film, respectively, only at the opening without contacting the first adherend film and the second adherend film in the interior space so that the first adherend film, the first adhesive auxiliary layer, the hot melt adhesive layer, the second adhesive auxiliary layer and the second adherend film seal the opening; and the electrolytic solution is disposed in the interior space and directly contacts the first adherend film and the second adherend film.

2. The electric instrument according to claim 1, wherein the cross-linkable group in the modified polymer (A) is a functional group containing silicon.

3. The electric instrument according to claim 1 wherein the modified polymer (A) comprises an olefin based modified polymer.

4. The electric instrument according to claim 1, wherein the modified polymer (A) comprises a modified polymer based on a copolymer of ethylene with at least one other olefin.

5. The electric instrument according to claim 1, wherein at least one of the first and second adhesive auxiliary layers is the layer of the silane coupling agent.

6. The electric instrument according to claim 1, wherein at least one of the first and second adhesive auxiliary layers is the layer of the (meth)acrylic resin.

7. The electric instrument according to claim 1, wherein at least one of the first and second adhesive auxiliary layers is the layer of the polyurethane.

8. The electric instrument according to claim 1, wherein at least one of the first and second adhesive auxiliary layers is the layer of the modified polyolefin.

9. The electric instrument of claim 1, wherein the first adherend film and second adherend film are each independently a material selected from the group consisting of polyethylene, polypropylene, polyethylene terephthalate, polyimide, polyester, cotton, wool, silk and rayon.

10. The electric instrument of claim 1, wherein the thermoplastic elastomer polyolefin (B) comprises an ethene-1-octene copolymer, a propylene ethylene copolymer, or a combination thereof.

11. The electric instrument according to claim 1, wherein the hot-melt adhesive layer is in direct contact with the electrolytic solution.

12. The electric instrument according to claim 1, wherein at least one of the first and second adherend films comprises polyimide.

13. An electric instrument comprising an electrolytic solution sealed within a pouch; comprising:

a first adherend film having a first surface;

a first adhesive auxiliary layer having opposing first and second surfaces and selected from a layer of a silane coupling agent, a (meth)acrylic resin, a polyurethane and a modified polyolefin, the first adhesive auxiliary layer second surface directly contacting and bonded to the first adherend film first surface;

a first hot-melt adhesive layer having opposing first and second surfaces, the first hot melt adhesive layer second surface directly contacting and bonded to the first adhesive auxiliary layer first surface;

a core material layer having opposing first and second surfaces, the core material layer selected from the group consisting of polyolefin, polyester, polyamide and combinations thereof in the form of a woven fabric, a nonwoven fabric, a film, and a sheet, the core material second surface directly contacting and bonded to the first hot melt adhesive layer first surface;

a second hot-melt adhesive layer having opposing first and second surfaces, the second hot-melt adhesive layer second surface directly contacting and bonded to the core material layer first surface;

a second adhesive auxiliary layer having opposing first and second surfaces and selected from a layer of a silane coupling agent, a (meth)acrylic resin, a polyurethane and a modified polyolefin, the second adhesive auxiliary layer second surface directly contacting and bonded to the second hot melt adhesive layer first surface;

a second adherend film having opposing first and second surfaces, the second adherend film second surface directly contacting and bonded to the second adhesive auxiliary layer first surface;

wherein the first and second hot-melt adhesive layers comprise a modified polymer (A) to which a cross-linkable group is given and a thermoplastic elastomer polyolefin (B);

wherein the first adherend film and the second adherend film form the pouch with an interior space and an opening; the first adhesive auxiliary layer and the second adhesive auxiliary layer, respectively, directly contact and are bonded to the first adherend film and the second adherend film, respectively, only at the opening without contacting the first adherend film and the second adherend film in the interior space so that the first adherend film, the first adhesive auxiliary layer, the first hot melt adhesive layer, the core, the second hot melt adhesive layer, the second adhesive auxiliary layer and the second adherend film seal the opening; and the electrolytic solution is disposed in the interior space and directly contacts the first adherend film and the second adherend film.

* * * * *